US007244115B2

(12) United States Patent
Krenchel et al.

(10) Patent No.: US 7,244,115 B2
(45) Date of Patent: Jul. 17, 2007

(54) EXTRUDER FOR PRODUCING BODIES OF CONSOLIDATED PARTICULATE MATERIAL

(75) Inventors: Herbert Krenchel, Hellerup (DK); Helge Fredslund-Hansen, Rødovre (DK); Henrik Stang, Nærum (DK)

(73) Assignee: 3H Inventors ApS, Naerum (DK)

( * ) Notice: Subject to any disclaimer, the term of this patent is extended or adjusted under 35 U.S.C. 154(b) by 87 days.

(21) Appl. No.: 10/158,935

(22) Filed: Jun. 3, 2002

(65) Prior Publication Data

US 2002/0142057 A1 Oct. 3, 2002

Related U.S. Application Data

(63) Continuation of application No. 08/765,905, filed as application No. PCT/DK95/00296 on Jul. 7, 1995, now Pat. No. 6,398,998.

(30) Foreign Application Priority Data

Jul. 8, 1994 (DK) .................................... 0830/94

(51) Int. Cl.
*B29C 1/26* (2006.01)

(52) U.S. Cl. ........................... 425/84; 264/86; 425/198

(58) Field of Classification Search .................. 425/84, 425/432, 456; 264/86, 87, 108, 177.2, 426, 264/444, 464; 366/31, 38, 28
See application file for complete search history.

(56) References Cited

U.S. PATENT DOCUMENTS 2,026,782 A 1/1936 Gouverneur
2,549,686 A 4/1951 Hjulian
2,694,349 A 11/1954 Hjulian
3,686,070 A 8/1972 Williams
3,994,639 A 11/1976 Hewitt
4,090,827 A 5/1978 Attwell
4,446,094 A * 5/1984 Rossiter ...................... 264/349
4,490,104 A * 12/1984 Lantz ......................... 425/197
4,943,402 A * 7/1990 Kafka et al. ................ 264/141
5,059,371 A 10/1991 Saheki
5,232,649 A * 8/1993 Andersen et al. ...... 264/211.23
5,249,948 A * 10/1993 Koslow ................... 425/376.1
5,667,814 A * 9/1997 Shah ......................... 425/72.2

* cited by examiner

*Primary Examiner*—Yogendra N. Gupta
*Assistant Examiner*—Emmanuel S. Luk
(74) *Attorney, Agent, or Firm*—Stites & Harbison PLLC; Douglas E. Jackson

(57) ABSTRACT

Shaped bodies of particulate material are produced by introducing an easily flowable slurry of water and particulate material into a mold with perforated walls and applying a sufficiently high pressure to the slurry in the mold so as to express a sufficient proportion of the liquid to allow physical contact and interengagement between the particles. The extrusion is carried out continuously in an extension process including: (A) introducing the slurry under high pressure, (B) conveying the slurry through a shaping section to (C) a draining and consolidation section with drain holds or slits (3), to leave the extruder through (E) an exit section in the form of a solid body (4).

20 Claims, 2 Drawing Sheets

EXTRUDER FOR PRODUCING BODIES OF CONSOLIDATED PARTICULATE MATERIAL

CROSS REFERENCE TO RELATED APPLICATION

This application is a continuation of application Ser. No. 08/765,905, filed Jan. 7, 1997, now U.S. Pat. No. 6,398,998; which is a U.S. national phase of PCT/DK95/00296 filed Jul. 7, 1995.

TECHNICAL FIELD

The present invention relates to an apparatus, and particularly an extruder, for producing shaped bodies.

BACKGROUND ART

A method for producing shaped bodies and associated apparatus are disclosed in BE-A-653,349 and SE-B-304,711 (both based on FR priority application No. 955,561 of 29 Nov. 1963). In this known method, an unhardened mixture comprising hydraulic cement and aggregate material (sand and gravel) with surplus water is compressed in an extruder of constant cross-sectional shape by means of a reciprocating piston, and in the terminal part of said extruder, the walls of which are suitably perforated, part of the water is removed by applying a vacuum to the outside of said walls, all this taking place while the material is moving slowly through the extruder.

Obviously, the pressure differential that can be produced by said vacuum arrangement is at the highest of the order of one bar. In addition to this, the reciprocating piston does, admittedly, exert a certain force, thus causing a corresponding increase in the pressure differential effecting the dewatering, but if sufficiently increased, this force will simply push the material out of the extruder, as no counter-force is provided to prevent this. This means, of course, that the total pressure differential across the perforated walls will at the most be of the order of a few bar. This in turn means that the ability of this previously known method to remove liquid from the spaces between the particles of the material is limited, and in many cases the quantity of the remaining liquid is sufficient: to prevent the shaped bodies produced from attaining more structural strength than just needed to keep their shape against the force of gravity, so that they, unless extreme care is taken, cannot be handled without deforming, collapsing or falling apart.

The above problem is, of course, less serious in the case of shaped bodies of clay, as such bodies can be allowed to or be made to harden respectively by well known methods before being moved, but the method referred to above is obviously insufficient, if the shaped bodies are to have a reasonable strength immediately upon having been produced by carrying out the method.

SUMMARY OF THE INVENTION

It is the object of the present invention to provide an extruder of the kind referred to initially, with which it is possible to produce shaped bodies having a considerable mechanical strength, so that they can be handled or manipulated mechanically immediately upon completion of the final step of the extruder without any risk of deforming, collapsing or falling apart.

By proceeding in this manner, the high pressure differential, produced by applying a high positive pressure to the inside of the perforated walls in the mould, will cause so much of the liquid between the particles to be expelled and the particles to come into such mutual engagement, that a shaped body having a considerable mechanical strength is produced, and as the slurry has already been homogenized, the shaped body will have a uniform structure throughout: its volume.

If the squeezing-out of the liquid occurs at the same time over the whole surface of the mould, there is a risk that dewatered and un-dewatered material moves about uncontrollably in the moulding space with the result that the end product does not become fully homogeneous. This disadvantage may be avoided by proceeding as set forth by the use of a mold, in which the perforations are distributed and adapted in such a manner so that the liquid will be expressed first from the parts of the mold situated most distant from the slurry inlet, then from parts of the mold less distant from said inlet, then from parts still closer to the inlet and so forth, until the complete molding space is occupied by closely packed and consolidated particulate material forming a compact body with very low porosity.

When proceeding in this manner, the final part of the pressing apparatus, when no further water can be squeezed out, can be characterized as powder pressing.

Thus, the apparatus as such commences in the form of high-pressure slurry pumping in one end of the mould and terminates as a powder-pressing process steadily progressing from the other end of the mould. It will be understood that in this case, the low-viscosity suspension will have no difficulty in flowing out into all nooks and crannies of the mould, and any air having been trapped during the filling-up of the mould will leave the mould cavity through its perforations together with the surplus liquid. The finished press-moulded object will constitute an accurate replica of the internal surfaces of the mould, and since the composite material already has solidified in the mould in the same moment as all surplus water has been squeezed out and mutual contact between the solid-matter particles has been achieved, it is now possible to remove the moulded object from the mould immediately just as with any other powder-pressing method or apparatus—since this object is now fully rigid and self-supporting and requires no more than being allowed to harden completely by hydration in a suitable manner.

Similar results with regard to making the dewatering and consolidation process progress steadily from one end or side of the mould to the other may be achieved by A) using a mold in which the liquid-permeability of the perforations diminishes steadily from the end of the mold most distant from the inlet towards the latter so as to make the removal of the liquid occur at the highest rate at said distant end and not a steadily diminishing rate when approaching the inlet or B) use of a mold in which the perforations may be closed and opened from the outside, the removal of the liquid being carried out by opening the perforations in a sequence beginning at the point in the mold most distant from the inlet and ending at the latter.

The perforations or holes in the walls of the moulds should, of course, be extremely fine, so that the water, but not the solid-matter particles may escape from the mould, but since water molecules are extremely small (approximately 20 Å), this should not be a problem.

The end product made by proceeding according to one of the embodiments of the extruder according to the invention is characterized by being exceptionally dense and with an absolute minimum of porosity and being highly homogeneous, and by, in the fully-hardened condition, to possess valuable physical properties comprising an optimum combination of strength and toughness.

Since, as described above, the mixing process is carried out with an arbitrary surplus amount of liquid, and the concentration of the material subsequently during the casting or moulding process is increased without “demixing” taking place, until no more liquid can be squeezed out from the confined material, it is possible in this case to achieve a considerably higher concentration of fibers in the end product than by using any other known moulding or casting principle, still with the fibers lying fully dispersed and well distributed and oriented throughout the product.

During the terminal part of the pressing apparatus, during which the solid particles are closely wedged and pressed together, so that the material solidifies, the particles are also pressed firmly against all fiber surfaces—in certain cases even into the surfaces of the fibers—resulting in optimum bond between the fiber and the matrix material and hence optimum fiber effect in the end product.

In this extruder, fibers and matrix material “grow together” in a manner not being known from other casting or moulding apparatuses, and after having fully hardened, the end product possesses unique physical properties.

With uniaxial tension loading, which is the most problematic form of loading to such brittle-matrix materials (because it is difficult for the fibers to take over the whole: tensional load when the matrix is over-strained), it is possible with a correctly reinforced BMC (Brittle-Matrix-Composite) material produced according to the present invention to achieve a stress-strain curve more reminiscent of the stress-strain curve for a metal or for a plastic material than for an ordinary brittle matrix material normally exhibiting an ultimate elongation at rupture of only approximately 0.01-0.02 percent (0.1-0.2 mm, per m).

After hardening, a correctly made BMC material produced according to the present invention will have a tensile stress-strain curve exhibiting so-called strain hardening, in which the tensile stress continues to increase—without any formation of visible or harmful cracks—even right up to a strain of 1-2% or more. Thus, the strainability (elasticity or flexibility if so preferred) of the matrix material has, by extreme utilization of the admixed fibers, been increased by a factor of 100 or more—and this without causing any damage to the composite material.

The mechanism behind the dramatically increased strainability of the composite material is that the internal rupturing of the matrix material between the fibers due to tensile straining occurs in a different manner than in similar non-reinforced material, as, on a microscopic level, an evenly distributed pattern of extremely fine and short microscopic cracks are formed, increasing in number with increased straining of the material; these microscopic cracks are, however, so small that they may be stopped or blocked by the surrounding fibers, and for this reason they cause no dramatic damage to the material as such.

This is in itself extremely valuable and applies in general to the high-quality BMC materials mentioned above as produced by the apparatus according to the invention. Further, experience has shown that for so-called FRC material produced with a normal Portland-cement matrix, the network of micro-cracks formed in the manner referred to above (with possible crack lengths of approximately 0.5-1 mm or less, width typically 10-50 gm) after being formed shows a marked tendency to self-healing, so that the material in the presence of moisture will again be dense, and so that the material when again being tension loaded achieves its original rigidity and strength and may be subjected to increased stresses in the same manner as during the first loading, also here exhibiting a smooth stress-strain curve and a convincing strain hardening with steadily increasing tensile stresses up to an ultimate straining capacity of 1-2% or more before the stresses begin to decrease.

The present invention also relates to a method for carrying out the apparatus of the invention.

Finally, the invention relates to a product, comprising a non-flowable body of consolidated closely-packed particles of solid materials produced by the method and/or apparatus of the invention.

Advantageous embodiments of the method and the apparatus, the effects of which—beyond what is self-evident—are explained in the following detailed part of the present description.

BRIEF DESCRIPTION OF THE DRAWINGS

In the following detailed portion of the present description, the invention will be explained in more detail with reference to the drawings.

DESCRIPTION OF THE PREFERRED EMBODIMENT

Figure 1:
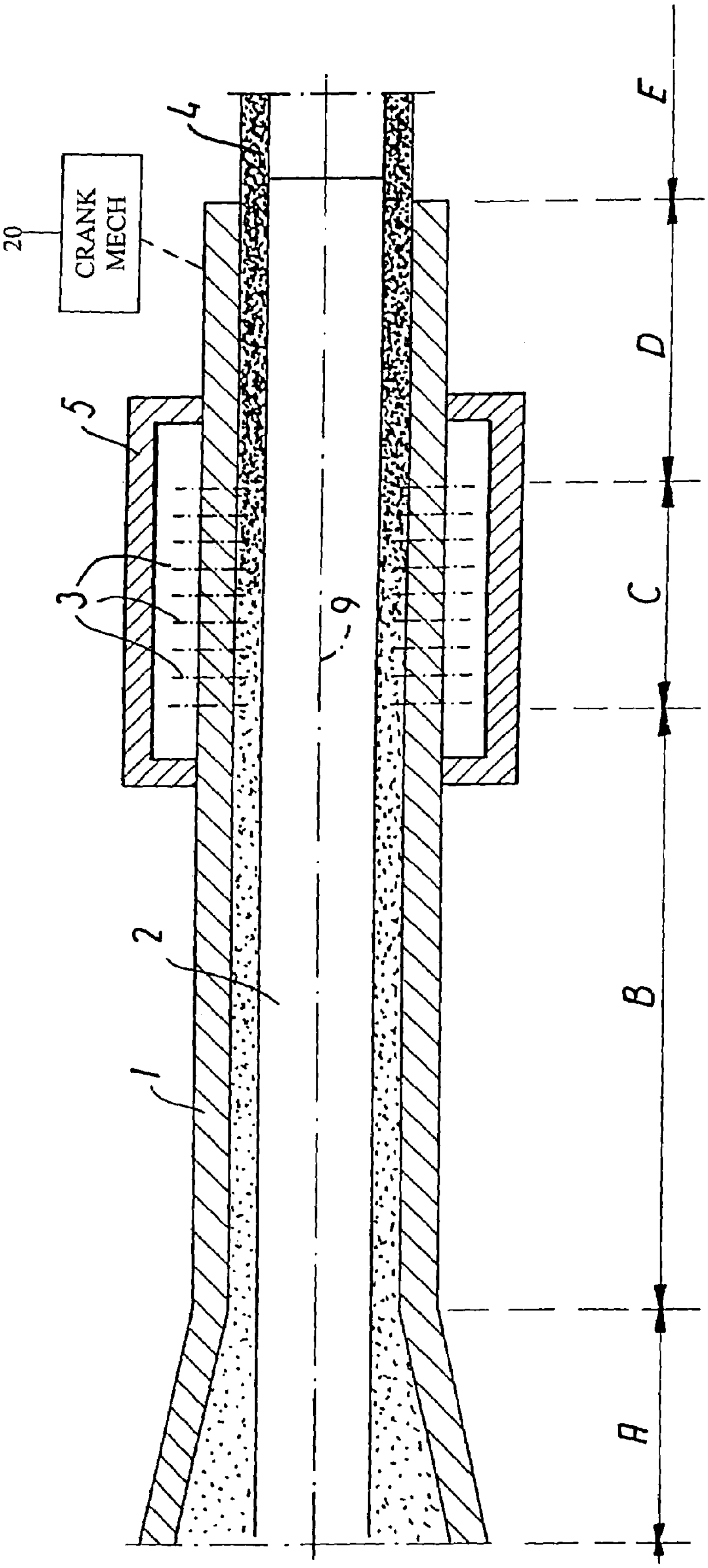
FIG. 1 is a diagrammatic. longitudinal sectional view through the parts of an extruder relevant to the invention.

FIG. 1 shows the parts of an extruder essential to the invention, specially, designed for producing tubular products, it being obvious that an extruder based on the same principles could also be used for extruding products with other cross-sectional shapes, such as flat or corrugated sheets or profiled stock of various cross-sectional shapes.

The parts of the extruder shown comprise an outer part 1, an inner part 2, a plurality of nozzles or slits 3 for draining-off liquid, as well as a pressure-regulating chamber 5.

As shown, the extruder is divided into four consecutive sections, i.e.

- an inlet section A for the supply of flowable suspension to be compacted, and
- a flow section B, in which the suspension having been supplied flows towards
- a drainage and consolidation section C leading into
- a solid-friction section D.

Further, FIG. 1 shows a further section, designated the exit section E, in which the extruded product leaves the extruder.

For ease of understanding, FIG. 1 shows the above-mentioned sections as quite distinct from each other, but in practice, two or more sections may overlap to a greater or lesser degree. Thus, the nozzles 3, shown in FIG. 1 as solely being present in the drainage and consolidation section C, may well also extend along at least a part of the solid-friction section D.

In the inlet section A, a flowable suspension containing the requisite amounts of powder, liquid (normally water) and possibly further components flows into the flow section B. The suspension supplied to the extruder comprises a surplus of water or other liquid, making it possible to achieve a good and homogeneous intermixing of the components of the suspension, that may have a consistency ranging from a thin slurry to a thick paste. Preferably, the ratio between liquid and dry matter is 1:1.

The mixing process may be carried out in a manner known per se, i.e. by using a high-performance mixer producing a paste-like particle suspension with the desired flowability, prior to supplying the latter to the inlet section A of the extruder by means of a high-pressure pump of a type capable of pumping material of this kind.

From the inlet section A, the suspension flows in the forward direction through the flow section B. The cross-sectional shape of the shaped product in this section B and the subsequent drainage and consolidation section C is determined by the internal shape of the outer part 1 and the external shape of the inner part 2. In the drainage and consolidation section C, surplus liquid is drained off, and the suspension is consolidated to form a solid material with direct contact between the individual particles throughout the product, as substantially all surplus liquid, i.e. substantially all liquid not remaining to occupy the interspaces between the closely packed particles in direct mutual contact, is removed. This draining-off function is caused by the pressure differential across the outer part 1 in the drainage and consolidation section C being applied to the nozzles or slits 3. The pressure differential constitutes the difference between on the one hand the hydrostatic pressure in the suspension in the flow section B and part of the drainage and consolidation section C, which may lie in the range of 20-400 bar, and on the other hand the pressure within the pressure-regulating chamber 5, that may be atmospheric pressure or somewhat higher or lower, as will be explained below.

Obviously, the high hydrostatic pressure reigning in the flow section B and at least the adjacent part of the drainage and consolidation section C can only be maintained, if the part of the extruder downstream of the drainage and consolidation section C comprises some means of obstructing flow. In the method according to the present invention, these means are provided by the non-flowable extruded product resulting from the drainage and consolidation described above, being present in the solid-friction section D. In this section D, the friction between the product 4 and the walls of the outer part 1 and the inner part 2 in contact with it is sufficient to provide a reaction force of substantially the same magnitude as the oppositely acting hydraulic force resulting from the hydraulic pressure upstream of the solid-friction section D. In operation, the supply pressure and the pressure in the pressure-regulating chamber 5 are attuned to each other and to the friction referred to in the solid-friction section D so as to allow the product 4 to advance at a suitable speed.

When the product 4 leaves the extruder in the exit section E, its porosity is extremely low and it contains substantially no more liquid than that occupying the interspaces between the closely packed particles, so that the product 4 is now rigid and has a sufficient dimensional stability to withstand handling during the subsequent processing without being deformed due to its own weight. Such subsequent processing may i.e. be firing in the case of a product containing clay, or hardening in the case of a product based on cement.

When starting-up the process, it is necessary to provide the reaction force referred to above by separate means, as the non-flowable product part has not yet been formed in the solid-friction section D. This may suitably be achieved by inserting a reaction-force plug (not shown) into the downstream end of the interspace between the outer part 1 and the inner part 2 so as to effect a temporary closure.

As soon as the non-flowable "plug" of consolidated material has been formed in the solid-friction section D, it will normally provide a sufficient reaction force, but will on the other hand, of course, require a considerable force to act upon it to overcome the friction against the extruder walls and move it forward.

With an extruder constructed according to the principle shown in FIG. 1, it may not always be possible to attune the pressures referred to above in such a manner, that the consolidated product in the solid-friction section D will be moved, as an increase in the supply pressure, i.e. an increase in the inlet section A and in the flow section B, may, cause the friction between the consolidated product and the extruder walls to produce a reaction force that will always be too high. The effects of this high frictional force may be reduced in a number of different ways to be explained below.

A first method of reducing the effect of friction between the consolidated material and the walls of the extruder consists in subjecting the exit portion of the extruder or a part of same to mechanical vibrations. The frequency of these vibrations may lie in the interval 10-400 Hz, while the interval 20-200 Hz is preferred and the interval 50-150 Hz is more preferred.

Another method of reducing the effect of the high friction referred to above is to subject the flowable suspension upstream of the consolidated product to pressure variations, so that periods with a first, lower pressure alternate with second, shorter periods with a second, higher pressure, said second pressure being approximately 1.58, preferably 2-4 times greater than said first pressure.

A third method of reducing the effect of the high friction referred to above is to vary the pressure in the pressure regulating chamber 5, so that the surface of the product in some periods is subjected to reduced pressure to support the draining-off process, and in other periods being subjected to a high-pressure to reduce the friction between the product and the extruder walls.

A fourth method of reducing the effect of the high friction referred to above is based on using an extruder, in which a first part, i.e. the outer part 1 shown in FIG. 1, is capable of being reciprocated in the longitudinal direction relative to another part of the extruder, e.g. the inner parts 2. With such relative movement, that may e.g. be effected by using a crank mechanism 20 (shown schematically), the product 4 will be made to "walk" stepwise in the downstream direction. The stepwise "walking" movement of the products achieved through the following mechanism: when both parts of the extruder are stationary, the resulting frictional force between the product and the extruder walls will act in the upstream direction with a magnitude always equal to the resulting force on the product in the downstream direction from the pressure in the flowable suspension.

However, when the movable part of the extruder is moved in the downstream direction, the friction stresses between the product and the movable extruder wall will change direction and result in a frictional force in the downstream direction. In this situation it is possible to attune the pressure in the flowable suspension in such a way that the resulting frictional force acting in the downstream direction together with the resulting force from the pressure in the flowable suspension is larger than or equal to the resulting frictional force acting in the upstream direction, thus causing the product to move in the downstream direction.

When the movement of the extruder is stopped or changed to the upstream direction, the resulting frictional forces on the product from both parts of the extruder will again act in the upstream direction causing the movement of the product to stop. It follows from the above that an extruder working according to this principle should be designed taking into consideration the cross-sectional area of the product, the working pressure in the flowable suspension and the size and frictional characteristics of on the one hand the surface between the stationary part of the extruder and the product and on the other hand the surface between the movable part of the extruder and the product.

Figure 2:
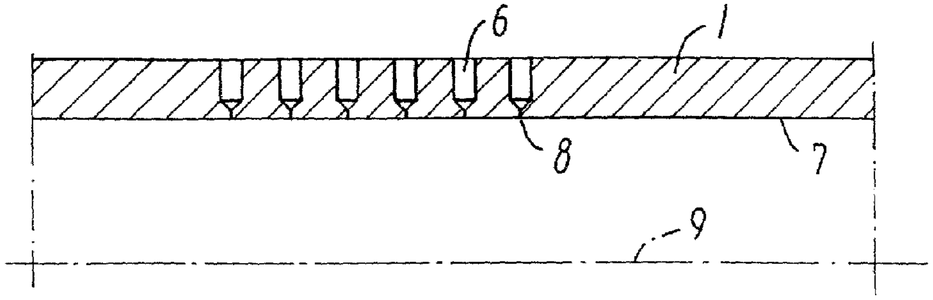
FIG. 2 shows an example of the formation of draining openings in the part of the extruder wall constituting the drainage section.

FIG. 2 shows one example of how the requisite permeability of the extruder wall in the drainage and consolidation section C may be achieved. Thus, in the outer part 1 a number of holes 6 have been drilled into the outer part 1 from the outside. As shown, the holes 6 only extend to within approx. 1 mm from the inside wall 7. In the latter, a plurality of extremely fine perforations 8 with transverse dimensions of the order of 0.001-0.01 mm extend through the respective drilled holes 6. The perforations 8 may be produced by means of e.g. spark erosion or by using a laser beam. FIG. 2 also shows the central axis 9 of the extruder.

Figure 3:
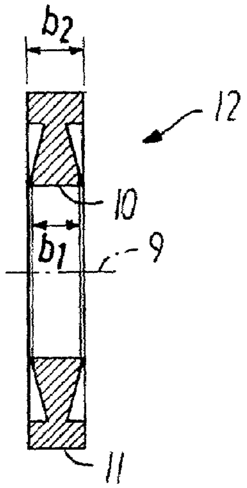
FIG. 3 is a sectional view through a ring adapted to co-operate with a number of similar rings to form an extruder wall with draining slits.
Figure 4:
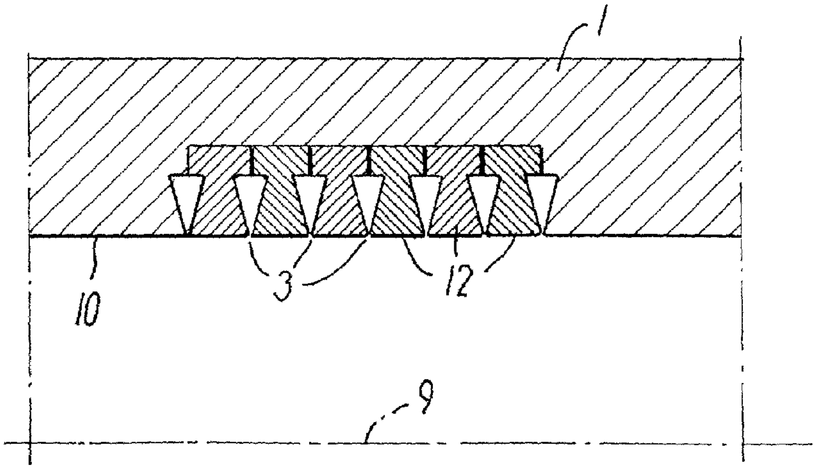
FIG. 4 shows a part of an extruder wall composed of a number of rings of the kind shown in FIG. 3.

Another way of providing the requisite openings in the drainage and consolidation section C is shown in FIGS. 3 and 4. Thus, FIG. 3 shows a ring to be used for this purpose, and FIG. 4 shows how a number of such rings are assembled to form a number of slits constituting said openings.

The ring 12 shown in FIG. 3 comprises an inner periphery 10 and an outer periphery 11. The width $b_1$ of the inner periphery 10 is a trifle, typically approximately 0.0010.01 mm, less than the width b2 of the outer periphery 11. Thus, when a number of rings 12 are clamped axially together in the extruder, slits 3 will be formed between them with a width of typically approximately 0.001-0.01 mm in the drainage and consolidation section C, through which the liquid to be drained off may escape. FIG. 4 shows a number of rings 12 of the kind shown in FIG. 3 mounted in the axial direction in the outer part 1 of the extruder, so that the inner peripheries 10 of the rings are aligned with the inside surface of the outer part 1 of the extruder. FIG. 4 shows the outer parts 1 and a plurality, in this case a total of six, individual rings 12 with the drainage slits 3 between the rings. The central axis 9 of the extruder will also be seen.

We claim:

1. An extruder for extruding shaped bodies formed from a flowable slurry containing particulate material and liquid, the extruder comprising: an extruder body having (a) an inlet space where the flowable slurry containing particulate material and liquid is supplied under a high hydrostatic pressure, (b) first and second walls of which respective opposed first and second surfaces together define an elongate moulding space into which the flowable slurry from the inlet section is introduced under the high hydrostatic pressure, said moulding space having a longitudinal flow axis and a uniform cross section, and (c) an extrusion outlet located adjacent a terminal end of the moulding space whose cross-sectional shape is defined by the surfaces of said first and second walls, and whose cross-sectional shape defines a shaped body extruded from the moulding space which shaped body is derived from the flowable slurry containing particulate material and a liquid; and (d) a friction section over a length of the moulding space between the intermediate portion and the extrusion outlet, said friction section including a friction contact between the shaped body and each of the opposed walls of the moulding space which said friction contact exerts a reaction force, on the shaped body against the high hydrostatic pressure by which the flowable slurry is supplied into the moulding space from said inlet space, said reaction force of said friction contact being sufficient by itself to at least substantially prevent the shaped body from moving alone the opposed walls and out of said extrusion outlet due to the high pressure of said flowable slurry without assistance to the shaped body;

a means for reducing said reaction force of said friction contact between the shaped body and each of the opposed walls in the friction section so that the shaped body exits from said extrusion outlet; and a plurality of passages at an intermediate portion of one of said first and second walls upstream from said extrusion outlet and in the molding space, which said passages open through the one of said first and second walls from the moulding space to define dewatering slots for the flowable slurry;

whereby said reaction force forms in the friction section a non-flowable consolidated material which is extrudable through the outlet as the shaped body, which shaped body is formed when liquid is expelled from the moulding space through the dewatering slots at the intermediate portion.

2. An extruder according to claim 1, wherein a plurality of recesses are formed in the one of the first and second walls, each recess being shaped so as to form a respective said passage.

3. An extruder according to claim 2, wherein each recess is milled into the one of the first and second walls.

4. An extruder according to claim 1, wherein each said passage is laterally elongate and includes a constricted region therealong which restricts the flow of particulate material laterally through that said passage.

5. An extruder according to claim 4, wherein a transverse width of the passage in the constricted region is in the range of 0.0001-0.5 mm.

6. An extruder according to claim 1, wherein the moulding space is annular in cross section whereby the extruder produces cylindrically shaped bodies, and wherein the intermediate portion includes a plurality of rings having an annular inner peripheral surface and an annular outer peripheral surface which said inner and outer peripheral surfaces are interconnected by opposite end faces, the annular inner peripheral surface defining part of the moulding space.

7. An extruder for extruding shaped bodies formed from a flowable slurry containing particulate material and liquid, the extruder comprising:

an extruder body having (a) an inlet space where the flowable slurry containing particulate material and liguid is supplied under a high hydrostatic pressure, (b) inner and outer walls of which an outer and an inner surface, respectively, are opposed and together define an elongate moulding space into which the flowable slurry from the inlet section is introduced under the high hydrostatic pressure, said moulding space having a longitudinal flow axis and a uniform cross section, and (c) an extrusion outlet located adjacent a terminal end of the moulding space whose cross-sectional shape is defined by the surfaces of said and outer walls, and whose cross section shape defines a shaped body extruded from the moulding space which shaped body is derived from the flowable slurry containing particulate material and a liquid; and (d) a friction section over a length of the moulding space between the intermediate portion and the extrusion outlet, said friction section including a friction contact between the shaped body and each of the opposed walls of the moulding space which said friction contact exerts a reaction force on the shaped body against the high hydrostatic pressure by which the flowable slurry is supplied into the moulding space from said inlet space, said reaction force of said friction contact being sufficient by itself to at least substantially prevent the shaped body from moving along the opposed walls and out of said extrusion outlet due to the high pressure of said flowable slurry without assistance to the shaped body;

a means for reducing said reaction force of said friction contact between the shaped body and each of the opposed walls in the friction section so that the shaped body exits from said extrusion outlet; and a plurality of passages at an intermediate portion of one of said inner and outer walls upstream from said extrusion outlet and in the molding space, which said passages open through the one of said inner and outer walls from the moulding space to define dewatering slots for the flowable slurry;

whereby said reaction force forms in the friction section a non-flowable consolidated material which is extrudable through the outlet as the shaped body, which shaped body is formed when liquid is expelled from the molding space through the dewatering slots at the intermediate portion.

8. An extruder according to claim 7, wherein one of said inner and outer walls defines a cavity which is adjacent to the moulding space and spaced by the moulding space from the extrusion outlet; and wherein the extruder further comprises a plurality of abutting members located in said cavity and defining between adjacent said abutting members said plurality of passages which define said dewatering slots, whereby said dewatering slots and said surfaces of the inner and outer walls cause said flowable slurry supplied into the moulding space under the high hydrostatic pressure to drain and consolidate by liquid being expelled through the dewatering slots from said moulding space.

9. An extruder according to claim 8, wherein each said passage is formed in at least one of the abutting longitudinal faces of adjacent said abutting members.

10. An extruder according to claim 9, wherein each said passage is milled into the longitudinal face of said abutting member.

11. An extruder according to claim 8, wherein each said passage includes a constricted region which restricts the flow of said particulate material therethrough.

12. An extruder according to claim 11, wherein a transverse width of the passage in the constricted region is in the range of 0.0001-0.5 mm.

13. An extruder according to claim 8, wherein the moulding space is annular in cross section whereby the extruder produces cylindrically shaped bodies, and wherein each said abutting member is shaped as a ring having an annular inner peripheral surface and an annular outer peripheral surface which said inner and outer peripheral surfaces are interconnected by opposite end faces, the annular inner peripheral surfaces of said abutting members defining part of the one of said inner and outer walls defining the moulding space.

14. An extruder according to claim 13, wherein said abutting members shaped as rings all have similar dimensions.

15. An extruder according to claim 7, wherein a plurality of recesses are formed in the one of the inner and outer walls, each recess being shaped so as to form a respective said passage.

16. An extruder according to claim 7, wherein each passage is laterally elongate and includes a constricted region therealong which restricts the flow of particulate material laterally through that said passage.

17. An extruder according to claim 16, wherein a transverse width of the passage in the constricted region is in the range of 0.001-0.01 mm.

18. An extruder for extruding shaped bodies formed from a flowable slurry containing particulate material and liquid, the extruder comprising: an extruder body having (a) an inlet section where the flowable slurry containing particulate material and liquid is supplied under a high hydrostatic pressure, (b) a liquid removing section into which the flowable slurry from the inlet section is introduced under the high hydrostatic pressure, said liquid removing section including a means for removing liquid from the flowable slurry to produce a non-flowable consolidated material, and (c) a friction section following said liquid removing section in which the non-flowable consolidated material is shaped into a shaped body in a moulding space having an extrusion outlet, said friction section including a friction contact between the shaped body and opposed walls of the moulding space which said friction contact exerts a reaction force on the shaped body against the high hydrostatic pressure by which the flowable slurry is supplied into the liquid removing section from said inlet section, said reaction force of said friction contact being sufficient by itself to at least substantially prevent the shaped body from moving along the opposed walls and out of said extrusion outlet due to the high pressure of said flowable slurry without assistance to the shaped body; and a means for reducing said reaction force of said friction contact between the shaped body and the opposed walls in the friction section so that the shaped body exits from said extrusion outlet.

19. An extruder according to claim 18 wherein said means for removing water includes dewatering slots located in an extension of one of said walls of said moulding space.

20. An extruder according to claim 18 wherein said means for reducing is a means for reciprocating one of said opposed walls of said moulding space relative to the other opposed wall.

* * * * *